United States Patent
Fujita et al.

(10) Patent No.: US 9,444,621 B2
(45) Date of Patent: Sep. 13, 2016

(54) ELECTRONIC KEY SYSTEM

(71) Applicant: Murata Manufacturing Co., Ltd., Nagaokakyo-shi, Kyoto-fu (JP)

(72) Inventors: Makoto Fujita, Nagaokakyo (JP); Yasuhiro Tamatani, Nagaokakyo (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 14/515,769

(22) Filed: Oct. 16, 2014

(65) Prior Publication Data

US 2015/0039892 A1    Feb. 5, 2015

Related U.S. Application Data

(63) Continuation of application No. PCT/JP2013/064577, filed on May 27, 2013.

(30) Foreign Application Priority Data

May 29, 2012 (JP) .................. 2012-121888

(51) Int. Cl.
  *G06F 21/00* (2013.01)
  *H04L 29/06* (2006.01)
  (Continued)

(52) U.S. Cl.
  CPC .......... *H04L 9/0825* (2013.01); *G06F 21/45* (2013.01); *G07C 9/00309* (2013.01);
  (Continued)

(58) Field of Classification Search
  CPC . H04L 9/0825; H04L 9/3226; H04L 9/0891; H04L 2209/805; G07C 9/00309; G07C 9/00571; G07C 2209/62; G07C 2009/00793; G06F 21/45
  See application file for complete search history.

(56) References Cited

U.S. PATENT DOCUMENTS

2002/0111918 A1* 8/2002 Hoshino ............... G06Q 20/06 705/65
2005/0021959 A1    1/2005 Tsushima et al.
(Continued)

FOREIGN PATENT DOCUMENTS

FR    EP 1291748 A2 *  3/2003  ............ G06F 21/35
JP    2004-110365 A    4/2004
(Continued)

OTHER PUBLICATIONS

Grant Ho, Derek Leung, Pratyush Mishra, Ashkan Hosseini, Dawn Song, David Wagner; "Smart Locks: Lessons for Securing Commodity Internet of Things Devices"; May 2016; ASIA CCS '16: Proceedings of the 11th ACM on Asia Conference on Computer and Communications Security; Publisher: ACM; pp. 461-472.*

(Continued)

*Primary Examiner* — Andrew Nalven
*Assistant Examiner* — Courtney Fields
(74) *Attorney, Agent, or Firm* — Keating & Bennett, LLP

(57) ABSTRACT

In a network to which a plurality of electronic devices and a server are connected, an electronic key system controls locking and unlocking of ID information output of each electronic device. Each electronic device includes a switching device that locks or unlocks output of ID information of each electronic device. The server includes an availability changing unit and a management unit. The availability changing unit unlocks only one of the plurality of electronic devices and locks the other electronic devices. The management unit updates a state at which the locking of ID information output and the unlocking of ID information output are swapped between a pair of the electronic devices.

17 Claims, 6 Drawing Sheets

(51) Int. Cl.
*G07C 9/00* (2006.01)
*H04L 9/08* (2006.01)
*H04L 9/32* (2006.01)
*G06F 21/45* (2013.01)
*G06F 21/35* (2013.01)

(52) U.S. Cl.
CPC ........ *G07C 9/00571* (2013.01); *H04L 9/3226* (2013.01); *G07C 2009/00793* (2013.01); *G07C 2209/62* (2013.01); *H04L 9/0891* (2013.01); *H04L 2209/805* (2013.01)

(56) References Cited

U.S. PATENT DOCUMENTS

| | | | |
|---|---|---|---|
| 2005/0209969 | A1 | 9/2005 | Kanazawa et al. |
| 2007/0250920 | A1* | 10/2007 | Lindsay .................. G06F 21/31 726/7 |
| 2008/0320298 | A1* | 12/2008 | De Vaan .................. G06F 21/34 713/155 |
| 2009/0075687 | A1 | 3/2009 | Hino et al. |
| 2011/0285528 | A1* | 11/2011 | Weinstein ............... E05B 19/22 340/539.11 |
| 2015/0161371 | A1* | 6/2015 | Hoshi ..................... G06F 21/32 726/19 |

FOREIGN PATENT DOCUMENTS

| | | |
|---|---|---|
| JP | 2005-039787 A | 2/2005 |
| JP | 2006-350473 A | 12/2006 |
| JP | 2007-004579 A | 1/2007 |
| JP | 2007-097009 A | 4/2007 |
| JP | 2009-530692 A | 8/2009 |
| WO | 2004/104799 A1 | 12/2004 |

OTHER PUBLICATIONS

Official Communication issued in International Patent Application No. PCT/JP2013/064577, mailed on Jul. 30, 2013.

* cited by examiner

| ELECTRONIC DEVICE NAME | ID | UNIQUE ID KEY | NORMAL ID KEY |
|---|---|---|---|
| WRIST WATCH | 1a | | O |
| DIGITAL CAMERA | 3a | | O |
| LAPTOP PC | 5a | | O |
| SMARTPHONE | 7a | O | |
| IC CARD | 9a | | O |

ELECTRONIC KEY SYSTEM

BACKGROUND OF THE INVENTION

1. Field of the Invention

The present invention relates to an electronic key system that uses a server to control outputs of ID information of plural electronic devices.

2. Description of the Related Art

In recent years, more variety of portable electronic devices such as cellular phones, laptop personal computers, IC cards, and the like, is becoming available. The number of electronic devices each user carries also has increased with this trend.

Some of such portable electronic devices store ID information to be used for personal identification, electronic payment of electronic money, authentication for locking and unlocking an automobile, a house, and the like. When such an electronic device is lost by accident or stolen, there is a risk that the ID information may be used by a third party who obtains the lost electronic device. Thus, countermeasures are necessary to prevent reading of ID information in case an electronic device storing the ID information is lost.

In view of this, an electronic device protection system disclosed in Japanese Unexamined Patent Application Publication No. 2009-530692 has a security key stored in an electronic device and an electronic device protection apparatus, and authentication of the security key with the electronic device protection apparatus is performed at the time when power of the electronic device is turned on, and the electronic device is allowed to operate only when the authentication is successful.

In the system described in Japanese Unexamined Patent Application Publication No. 2009-530692, once the security key is authenticated, the electronic device may be freely operated until its power is turned off. Thus, when ID information is stored in the electronic device, the ID information becomes free to use until the power of the electronic device is turned off.

Thus, when a user carries a plurality of electronic devices at the same time and loses some of the electronic devices that the user forgot to power off after using them, there is a risk that ID information may be used by a third party who obtains these electronic devices.

SUMMARY OF THE INVENTION

In view of the above, preferred embodiments of the present invention provide an electronic key system that prevents the use of ID information stored in an electronic device by a third party even when the electronic device whose power is on is lost.

In a network to which a plurality of electronic devices and a server are connected, an electronic key system according to a preferred embodiment of the present invention controls locking and unlocking of ID information output of each electronic device. Each electronic device includes a switching device that is configured to lock or unlock outputting of ID information of each electronic device. The server includes an availability changing unit and a management unit. The availability changing unit unlocks only one of the plurality of electronic devices and locks the remaining electronic devices. The management unit updates a state in which the locking of ID information output and the unlocking of ID information output are swapped between any pair of the electronic devices.

In a preferred embodiment of the present invention, locking of the ID information output unit disables reading of ID information and its usage in electronic payments or authentications. Further, unlocking of the ID information output unit allows outputting of the ID information and its usage in electronic payments or authentications.

In this configuration, only one of the plurality of electronic devices is unlocked for the ID information output whereas the remaining electronic devices are locked. Here, the number of the electronic devices whose ID information outputs are in an unlocked state is limited to one. Thus, with regard to the remaining electronic devices, the ID information output is locked even when the power is on. Accordingly, even when the electronic device in which ID information output is locked is lost, a third party who obtains the lost electronic device cannot use the ID information. Thus, unauthorized and undesired usage of ID information is prevented. Further, unlike the conventional art, it is not necessary to turn off the power of the electronic device since the ID information output of the electronic device is locked. This improves user-friendliness. Further, by limiting the number of the electronic devices whose ID information outputs are in the unlocked state to one, the risk of ID information theft is significantly reduced or prevented.

The server preferably includes a table describing the unlocked and locked states of the plurality of electronic devices.

In this configuration, the server is configured and programmed to control the unlocked and locked states of the plurality of electronic devices. This makes it possible to consistently limit the number of the electronic devices whose ID information outputs are in the unlocked state to one.

The electronic device may include a communication device configured to perform identity authentication with the server before outputting ID information when the ID information output is in the unlock state.

In this configuration, the electronic device performs the identity authentication with the server before outputting ID information. This makes it possible to confirm whether or not this electronic device is registered in advance or whether or not there is any problem in allowing outputting of the ID information or the like. Thus, the use of ID information by a third party is prevented.

When a pair of the electronic devices are connected to the server and a request is issued from the pair of the electronic devices to swap the lock and the unlock of ID information output, the management unit preferably updates the table after performing the identity authentication of the pair of the electronic devices.

In this configuration, the table is updated when the lock and the unlock of ID information output are swapped between the electronic devices. This enables the server to consistently control a locked state or an unlocked state of ID information output in each electronic device.

The electronic device preferably further includes a near field communication device and a clone table that has an identical content as that of the table included in the server. Further, in the electronic key system, when a pair of the electronic devices are connected via the near field communication device and a request is issued between the pair of the electronic devices to swap the lock and the unlock of ID information output, the clone table is updated after identity authentication of the pair of the electronic devices at a first step, and the table is updated by the management unit of the server at a second step.

In this preferred embodiment of the present invention, the electronic device preferably includes the clone table and the near field communication device. Thus, the lock and the unlock of ID information output preferably are swapped between the electronic devices without involving the server. This makes it possible to switch the lock of ID information of the electronic device to the unlock to use the ID information even in a place where the communication between the electronic device and the server is not available. Further, the table of the server is updated when the communication between the electronic device and the server is available after the clone table is updated. This makes it possible to maintain consistency of the locked and unlocked states of ID information outputs of the respective electronic devices in the electronic key system.

When one of the electronic devices is connected to the server and a request is issued to swap the lock and the unlock of ID information output between the one of the electronic devices and another electronic device thereof, the management unit of the server preferably updates the table after performing identity authentication of the one of the electronic devices that is connected to the server. Further, when the another electronic device is connected to the server, the management unit causes the switch of this electronic device to switch its ID information output based on the table updated after performing identity authentication of this electronic device.

This configuration makes it possible to swap the lock and the unlock of ID information output even when one of the two electronic devices is unable to communicate. Thus, even when an electronic device in which the ID information output is in the unlocked state is lost, ID information may be used by switching the locked state of ID information output of an electronic device to the unlocked state.

According to various preferred embodiments of the present invention, even when an electronic device whose power is on is lost, ID information stored in the lost electronic device is prevented from being used by a third party.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
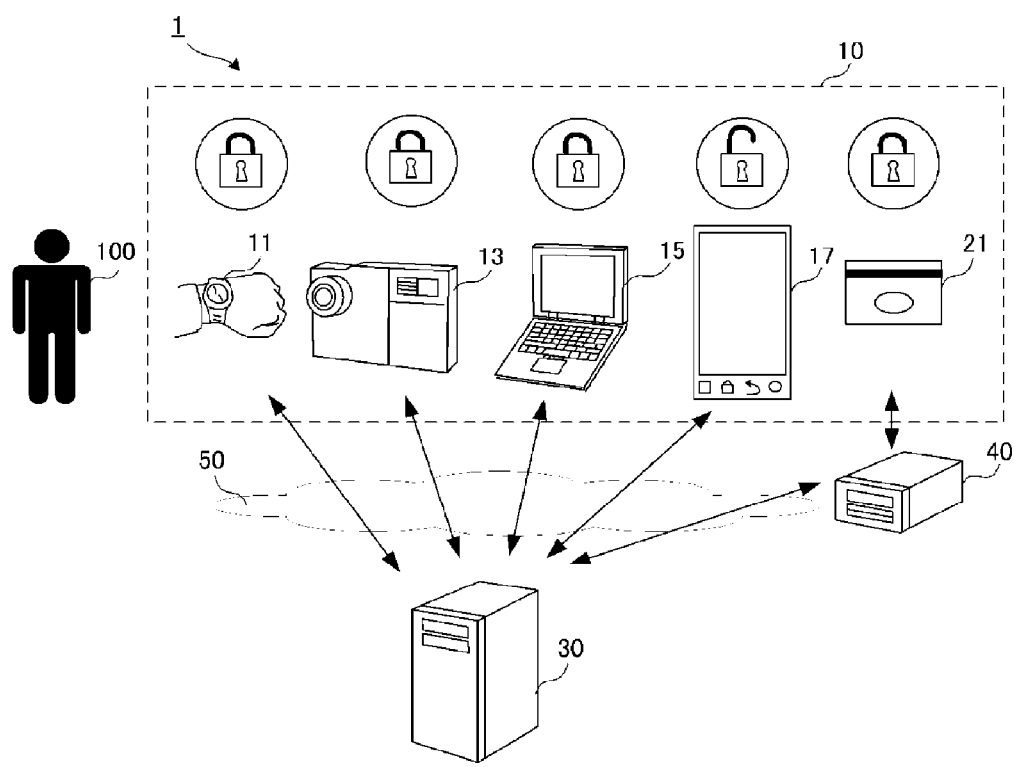
FIG. 1 is a configuration diagram illustrating an outline of an electronic key system.

As illustrated in FIG. 1, an electronic key system 1 preferably includes electronic devices 10, a server 30, and a reader/writer device (hereinafter, referred to as an R/W device) 40. The electronic devices 10 and the R/W device 40 are connected to each other in a network space through the server 30 and a network 50 using wireless or wired connections.

A user 100 owns a plurality of the electronic devices 10. The plurality of the electronic devices 10 that the user 100 owns may include, for example, a wrist watch 11, a digital camera 13, a laptop PC 15, a smartphone 17, and an IC card 21.

Each electronic device 10 is configured to have its own device specific functionality such as a communication function, a camera function, and the like. Further, each electronic device 10 stores its own ID information. This ID information is used for personal identification, electronic payment of electronic money, authentication to lock and unlock an automobile, a house, and the like.

When ID information is used, a wireless communication is performed between the electronic device storing ID information and a reader device of ID information. The ID information read out is used for authentication or electronic payment or the like. Encrypting ID information is configured to prevent the ID information from being easily used by a third party when an electronic device is lost and comes into the third party's possession.

In the electronic key system 1, of the plurality of electronic devices 10, only one electronic device is unlocked for ID information output while the remaining other electronic devices are locked for ID information output. For example, as illustrated in FIG. 1, only the smartphone 17 is unlocked for ID information output while the other electronic devices are locked for ID information output. Each electronic device may be switched between unlocked and locked states. The details will be described later.

The server 30 is configured and programmed to control information of the electronic devices 10. Further, the server 30 includes a control unit 303 (will be described later in detail) that is configured and programmed to control the use of ID information in such a way that only one of the plurality of electronic devices 10 is unlocked for ID information output. The control unit 303 corresponds to an availability changing unit. The server 30 preferably is installed in a data center or the like.

The R/W device 40 is a terminal that reads ID information stored in the electronic device 10 when performing an electronic payment of electronic money or the like. Further, the R/W device 40 is used in a process to restrict the use of ID information when the electronic device 10 is lost. The R/W device 40 is installed in a location that is easily accessible by users such as a convenience store or the like.

Figure 2A:
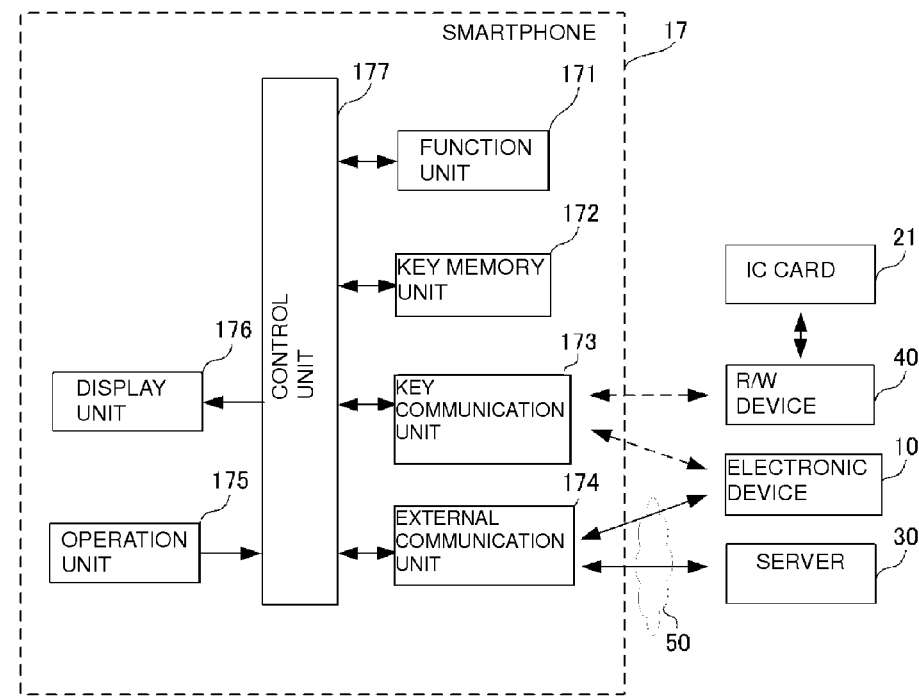
FIG. 2A is a block diagram illustrating a configuration of a smartphone.

The smartphone 17 which is an example of the electronic device 10 preferably has the following configuration. As illustrated in FIG. 2A, the smartphone 17 includes, in addition to a function unit 171 that is configured to handle calls and operate software programs stored therein, a key memory unit 172, a key communication unit 173, an external communication unit 174, an operation unit 175, a display unit 176, and a control unit 177.

The key memory unit 172 is configured to store an ID key. The ID key is an electronic key for which its own ID is set. The ID key is set as a unique ID key or a normal ID key depending on the presence or absence of a flag. In other words, the ID key is set as the unique ID key when the flag is on (when the flag is present) whereas the ID key is set as the normal ID key when the flag is off (when the flag is absent). When the ID key stored in the key memory unit 172 is the unique ID key, the output of ID information is put into unlocked state, and the ID information may become available for use in electronic payment or authentication. On the other hand, when the ID key stored in the key memory unit 172 is the normal ID key, the output of ID information is put into locked state, and the ID information may not be used for electronic payment or authentication. As described above, in the electronic key system 1, only one of the plurality of electronic devices 10, which may be arbitrarily selected, is assigned to the unique ID key. Further, all the other remaining electronic devices 10 other than the electronic device 10 assigned to the unique ID key are assigned to the normal ID keys.

Figures 3, 4:
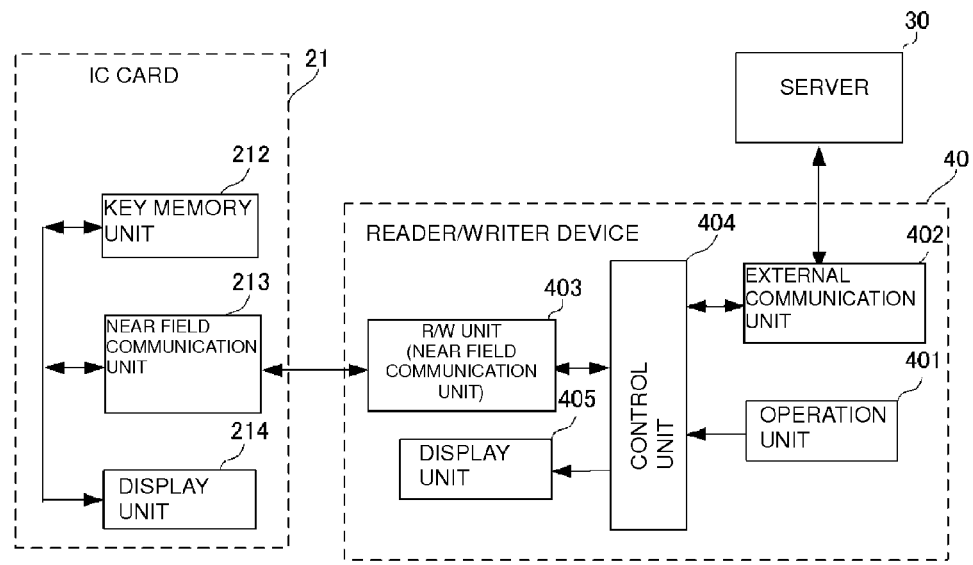
FIG. 3 is a table illustrating, for each electronic device, ID and which of a unique ID key or a normal ID key is used.
FIG. 4 is a block diagram illustrating configurations of an IC card and a reader/writer.

The key memory unit 172 preferably stores a clone table that describes information of the ID key assigned to each electronic device 10 as illustrated in FIG. 3. A table that this clone table is based on is controlled by the server 30, as will be described later. The clone table describes the identical content as the table controlled by the server 30 describes. In this table, information such as names of electronic devices to which the ID keys are assigned in advance, different IDs assigned to respective electronic devices, whether the ID key is set as the unique ID key or the normal key, and the like is described. Each electronic device 10 updates the content of the clone table when communicating with the server 30 or the like.

The key communication unit 173 corresponds to a near field communication device and communicates with the other electronic device 10 or the R/W device 40 when rewrites the ID key of the key memory unit 172. The key communication unit 173 is configured to perform a near field communication function (hereinafter, simply referred to as NFC) by near field communication (NFC). As NFC, any of standards such as Type A, Type B, Felica (registered trademark) may be used, for example.

The external communication unit 174 communicates with the server 30 through the network 50.

The operation unit 175 corresponds to a switching device and is configured to receive user operations such as an operation to request swap between lock and unlock of ID information output.

The display unit 176 is configured to display items to be conveyed to a user.

The control unit 177 is configured and programmed to determine whether the key memory unit 172 stores the unique ID key or the normal ID key when the operation unit 175 receives a read request of ID information. The control unit 177 is configured and programmed to read the ID information from the key memory unit 172 when the key memory unit 172 stores the unique ID key. The control unit 177 preferably does not read the ID information from the key memory unit 172 when the key memory unit 172 stores the normal ID key.

When there is a need to read ID information, the control unit 177 swaps the electronic keys with the electronic device 10 that stores the unique ID key through the key communication unit 173 based on the clone table stored in the key memory unit 172, which will be described later. Further, the control unit 177 swaps the electronic keys through the key communication unit 173 when the key memory unit 172 stores the unique ID key and a swap operation of electronic keys occurs at another electronic device 10.

All the electronic devices 10 except the IC card 21 preferably have similar configurations as that of the smartphone 17.

Figure 2B:
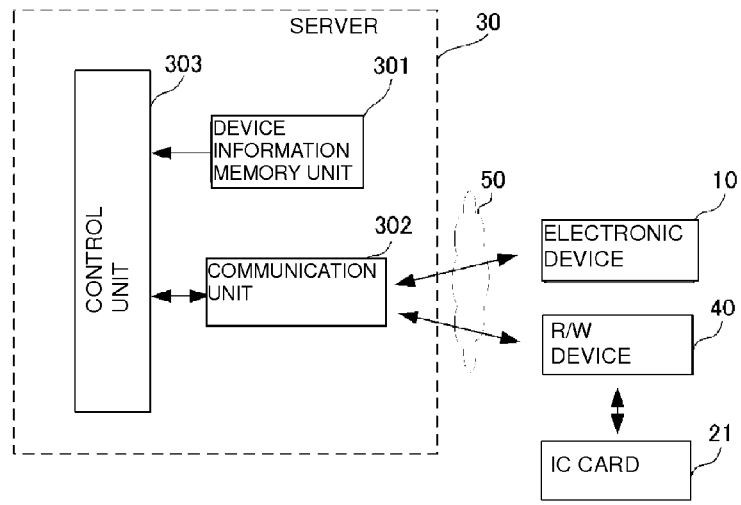
FIG. 2B is a block diagram illustrating a configuration of a server.

As illustrated in FIG. 2B, the server 30 includes a device information memory unit 301, a communication unit 302, and the control unit 303.

The device information memory unit 301 is configured to store the ID of each ID key and which of the unique ID key or the normal ID key each electronic device is assigned to, as in the table illustrated in FIG. 3.

The communication unit 302 is configured to communicate with the plurality of the electronic devices 10 and the R/W device 40 through the network 50.

The control unit 303 corresponds to a management unit and is configured and programmed to confirm whether the electronic key is a registered one by communicating through the communication unit 302 when a reading of ID information of the electronic device 10 occurs. Further, the control unit 303 is configured and programmed to permit or not permit the reading of ID information.

As illustrated in FIG. 4, the IC card 21 includes a key memory unit 212, a near field communication unit 213, and a display unit 214.

The key memory unit 212 stores, as with the smartphone 17, the ID key that is an electronic key to which an ID is set. This ID key is set as the unique ID key or the normal ID key depending on the presence or absence of an ID flag.

When the R/W device 40 reads ID information of the IC card 21, the near field communication unit 213 reads the ID information of the electronic key from the key memory unit 212 and transmits it to the R/W device 40. Further, the near field communication unit 213 writes electronic key information received from the R/W device 40 to the key memory unit 212.

The display unit 214 displays which of the unique ID key or the normal ID key the key memory unit 212 stores.

The IC card 21 may include an electric storage device. The electronic storage device may be a primary battery or a secondary battery or an electric double layer capacitor, or a combination of an electric generator device such as a solar cell, a vibration powered generator, or the like and a secondary battery or an electric double layer capacitor. These may be used, for example, to power blinking of the display unit 214.

As illustrated in FIG. 4, the R/W device 40 includes an operation unit 401, an external communication unit 402, a read/write unit (hereinafter, referred to as R/W unit) 403, a control unit 404, and a display unit 405.

The operation unit 401 is configured to receive inputs and instructions from a user.

The external communication unit 402 is configured to communicate with the server 30.

The R/W device unit 403 is configured to perform near field communication with the electronic device 10 by NFC and reads ID information of the ID key and the like.

The control unit 404 is configured and programmed to control the external communication unit 402 and the R/W unit 403 in response to an operation received with the operation unit 401.

The display unit 405 displays items to be conveyed to a user.

As described above, in the electronic key system 1, the electronic key in only one of the plurality of electronic devices 10, which may be arbitrarily selected, is set to the unique ID key. Further, in all the other remaining electronic devices 10 other than the electronic device 10 assigned to the unique ID key, the electronic keys are set to the normal ID keys.

For example, when the ID key stored in the key memory unit 172 of the smartphone 17 is set to the unique ID key, ID information of the unique ID key may be read for use. The smartphone 17 communicates with the server 30 and performs identity authentication when reading ID information. At this time, the server 30 checks the ID information of the unique ID key of the smartphone 17 and allows the use of the ID information when the ID of the unique ID key is the one that is registered in the table in advance and no report of a missing device or the like is registered. For example, a user may perform an electronic payment of electronic money using the unique ID key of the smartphone 17 when purchasing a product in a convenient store or the like.

On the other hand, in the electronic key system 1, ID information of the normal ID key may not be read for use when, for example, the smartphone 17 stores the normal ID key in the key memory unit 172.

When the user 100 wishes to use ID information of a first electronic device to which the normal ID key is assigned, the first electronic device swaps the locked state of ID information output and the unlocked state of ID information output with a second electronic device to which the unique ID key is assigned. Specifically, this is performed as follows.

Figure 5A:
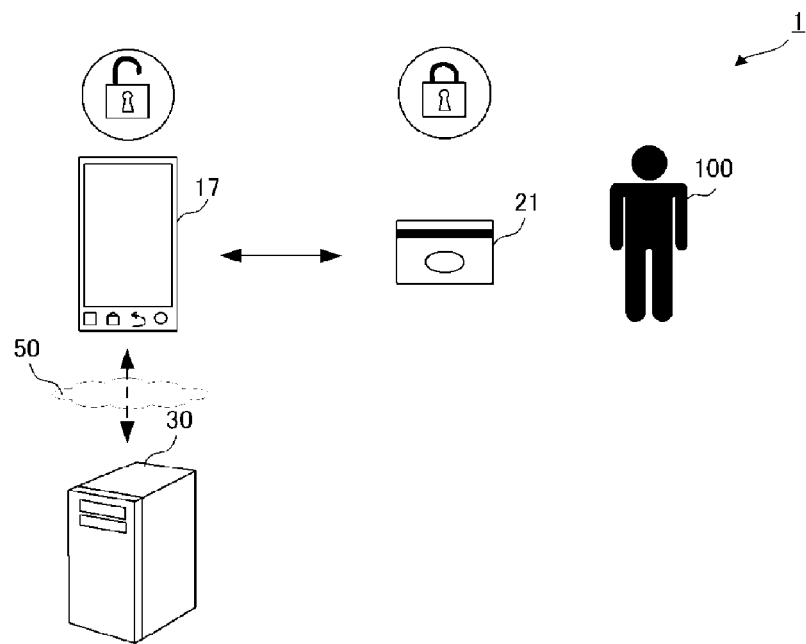
FIGS. 5A and 5B are image illustrations illustrating when an electronic key swap process is performed between a smartphone and an IC card.

An exemplary case is described in which a user 100 is carrying the smartphone 17 and the IC card 21. As illustrated in FIG. 5A, the smartphone 17 is in the unlocked state whereas the IC card 21 is in the locked state. Note that the display unit 176 of the smartphone 17 displays that the smartphone 17 is in the unlocked state. Further, the IC card 21 includes a battery therein, blinks an LED (display unit 214) in the unlocked state, and turns off the LED in the locked state.

To unlock the output of ID information of the smartphone 17 for use, the user 100 arranges the smartphone 17 in the locked state and the IC card 21 in the unlocked state in close proximity. Subsequently, the user 100 operates the operation unit 175 of the smartphone 17 to start a lock/unlock swap process.

Upon receiving a request of the lock/unlock swap process, the control unit 177 of the smartphone 17 performs ID identity authentication with the IC card 21 by NFC. In other words, the control unit 177 of the smartphone 17 transmits a transmission request of ID key information from the key communication unit 173. The near field communication unit 213 of the IC card 21 reads information of the ID key (normal ID key) from the key memory unit 212 and transmits it to the smartphone 17. Upon receiving the normal ID key information (registration number information), the control unit 177 of the smartphone 17 checks whether the ID information of the normal ID key of the IC card 21 is registered in a table read out from the key memory unit 172 or not.

If the ID of the normal ID key of the IC card 21 is included in the table of device information read out from the key memory unit 172, it means that the IC card 21 is the registered one. After this identify authentication, the control unit 177 changes the ID keys of the smartphone 17 and the IC card 21.

Specifically, the control unit 177 is configured and programmed to transmit a change request of ID key from the key communication unit 173. Upon receiving the change request of ID key, the near field communication unit 213 of the IC card 21 turns off the flag of the ID key in the key memory unit 213 and changes the ID key from the unique ID key to the normal ID key. When the near field communication unit 213 of the IC card 21 receives the unique ID key, the near field communication unit 213 stores the unique ID key in the key memory unit 212 and causes the LED of the display unit 214 to blink.

The control unit 177 turns on the flag of the ID key in the key memory unit 172 and changes the ID key from the normal ID key to the unique ID key. Further, the control unit 177 updates the content of the clone table stored in the key memory unit 172 based on the foregoing changed contents.

Further, the control unit 177 transmits the updated content of the clone table, namely, results of the lock/unlock swap process performed between the smartphone 17 and the IC card 21, to the server 30 when communication with the server 30 through the network 50 is available. The control unit 303 of the server 30 updates the table stored in the device information memory unit 301 to the content thus swapped based on the information from the control unit 177 of the smartphone 17.

Figure 5B:
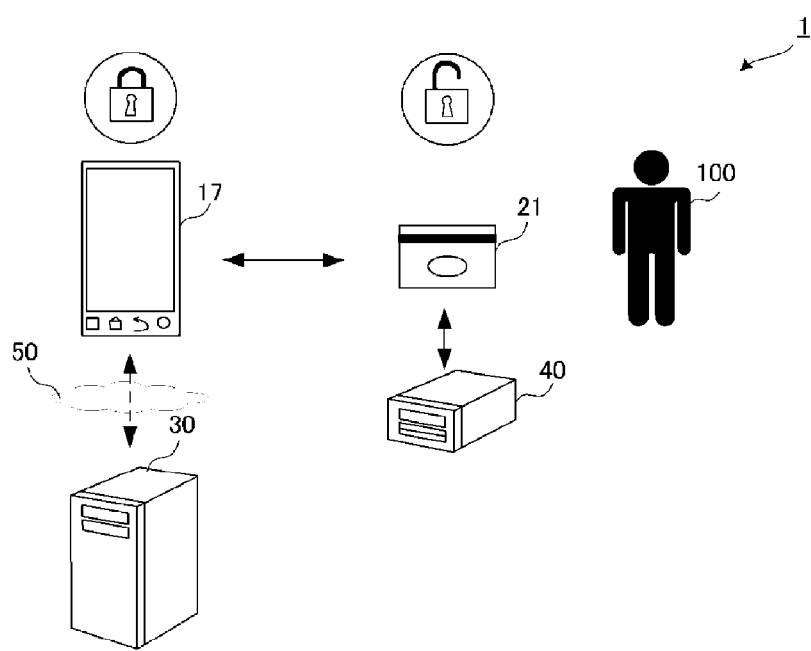

According to the foregoing processes, as illustrated in FIG. 5B, the ID key of the smartphone 17 is set to the normal ID key while the ID key of the IC card 21 is set to the unique ID key. The user 100 may, for example, allow the IC card 21 and the R/W device 40 installed in a convenient store to have near field communication between them and perform an electronic payment of electronic money.

As is described in the above, in the electronic key system 1, the identity authentication of electronic key preferably is performed before reading the ID information of the IC card 21 and performing the electronic payment. For example, the R/W device 40 queries the server 30 as to whether or not the electronic key stored in the IC card 21 is the unique ID key and ID of this unique ID key is the one registered in advance. When it is confirmed that the unique ID key is registered in advance, the use of ID information is permitted. On the other hand, when it is determined that the unique ID key is not registered in advance or that the electronic key is the normal ID key, the use of ID information is not permitted. This enables to limit the use of ID information so that only one of the electronic device may use its ID information even when the user 100 is carrying a plurality of the electronic devices 10. Further, this prevents unauthorized use of the ID information.

As illustrated in FIG. 5B, even in a case where the ID information output is unlocked in the IC card 21 and the ID information output is locked in the smartphone 17, the lock/unlock swap process may be performed as described above by performing direct wireless communication between them by NFC.

Further, the direct wireless communication is performed by NFC between the smartphone 17 and the IC card 21. This may be performed even in an area where signals of mobile telephone network cannot be reached. Further, since this is the near field communication, power consumption is significantly reduced.

In the foregoing example, the identity authentication preferably is performed between the ID key of the IC card 21 and the ID information of the clone table stored in the key memory unit 172 of the smartphone 17. However, the method of identity authentication is not limited to this example. Alternatively, the identity authentication may be performed between the ID key of the IC card 21 and the ID information of the table stored in the device information memory unit of the server 30 by accessing the server 30 from the smartphone 17 through the network 50.

Unlocking the ID information output only at one of a plurality of electronic devices as described above allows the user 100 to have the following modes of use, for example.

When the user 100 goes jogging or running, the user 100 wishes to be light as much as possible. Thus, the user 100 wears only the wrist watch 11 whose ID information output is in the unlocked state, and the other electronic devices may be stored safely at a known place with their ID information outputs being in the locked state.

In a facility where multifunctional electronic devices such as the smartphone 17 are prohibited to be brought in, the user 100 may carry only the IC card 21 that has limited functionality and whose ID information output is in the unlocked state, and the other electronic devices may be stored safely at a known place with their ID information outputs being in the locked state.

Next, in a preferred embodiment of the present invention, the unique ID key of a lost electronic device preferably is changed to the normal ID key by performing an electronic lock/unlock swap process using the R/W device 40 and the server 30 when the electronic device storing the unique ID key is lost. This process is described below.

Figure 6A:
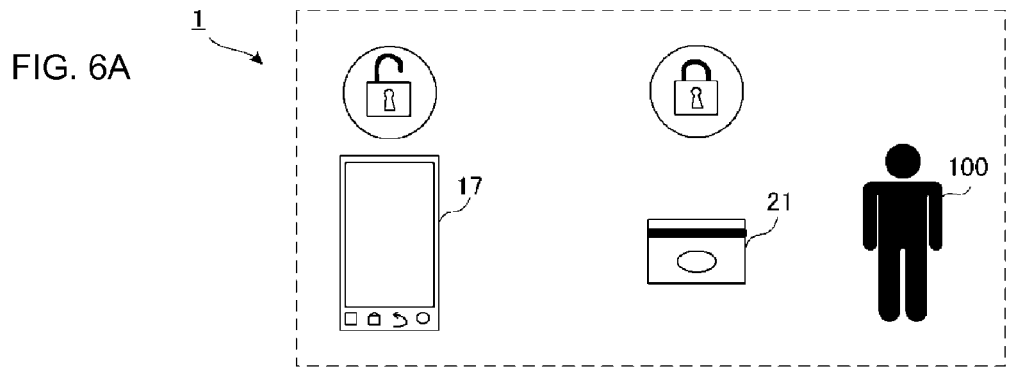
FIG. 6A is an image illustration illustrating a state where a user is carrying a smartphone and an IC card.
Figure 6B:
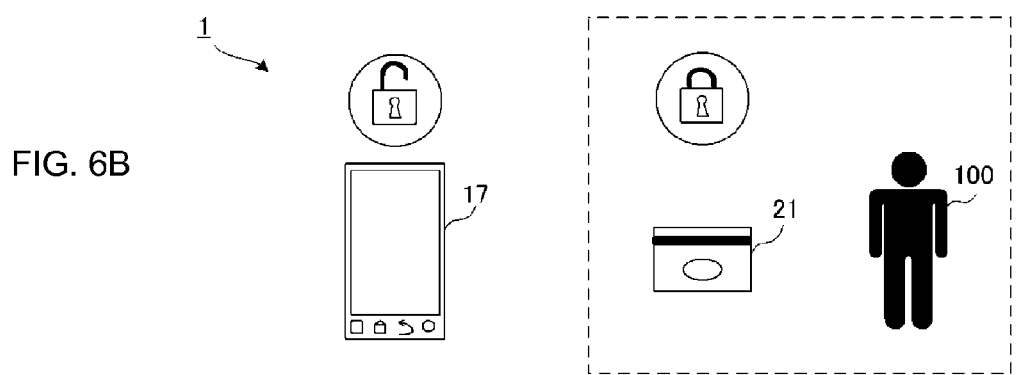
FIG. 6B is an image illustration illustrating a state where a user lost the smartphone and is carrying only the IC card.

As illustrated in FIG. 6A, the user 100 was carrying the smartphone 17 in the unlocked state and the IC card 21 in the locked state, but accidentally lost the smartphone 17 as illustrated in FIG. 6B. In this case, there is a risk that the ID information of the smartphone 17 may be used by a third party. Further, the IC card 21 the user 100 is carrying is in the locked state. Thus, the user 100 cannot use the ID information of the IC card 21.

Figure 6C:
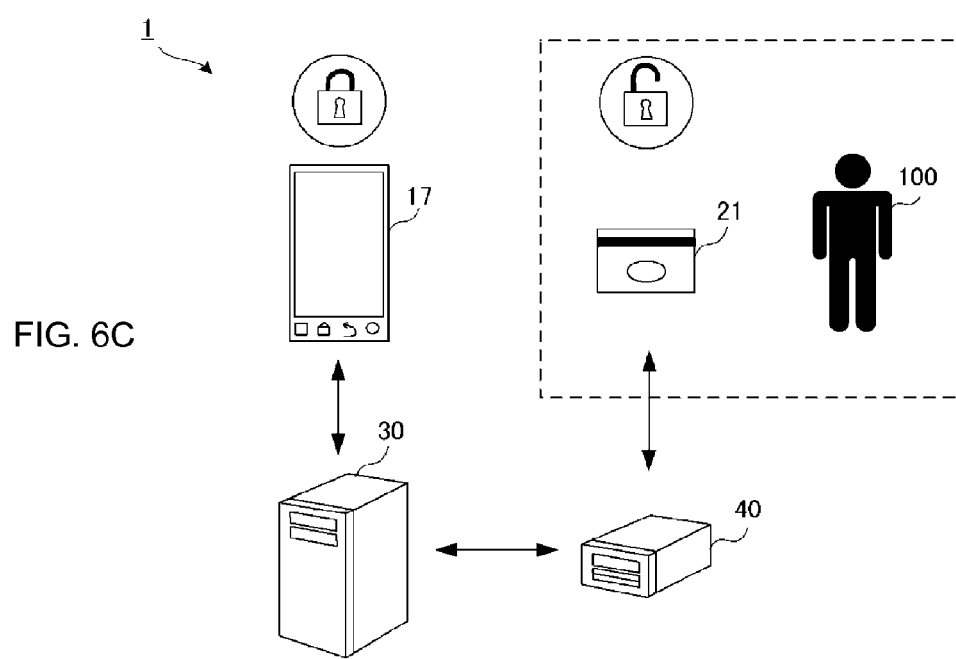
FIG. 6C is an image illustration when electronic keys of the lost smartphone and the carrying IC card are being swapped.

In such a case, as illustrated in FIG. 6C, the user 100 may perform the swap process of the electronic keys between the IC card 21 in the locked state and the lost smartphone 17 by use of the R/W device 40 installed in, for example, a convenient store as is the case described above.

Specifically, to perform the lock/unlock swap process of ID information output, the user 100 first operates the operation unit 401 of the R/W device 40 to report missing of an unlocked state electronic device (that stores the unique ID key) and apply for the lock/unlock swap process of ID information output.

Figure 7:
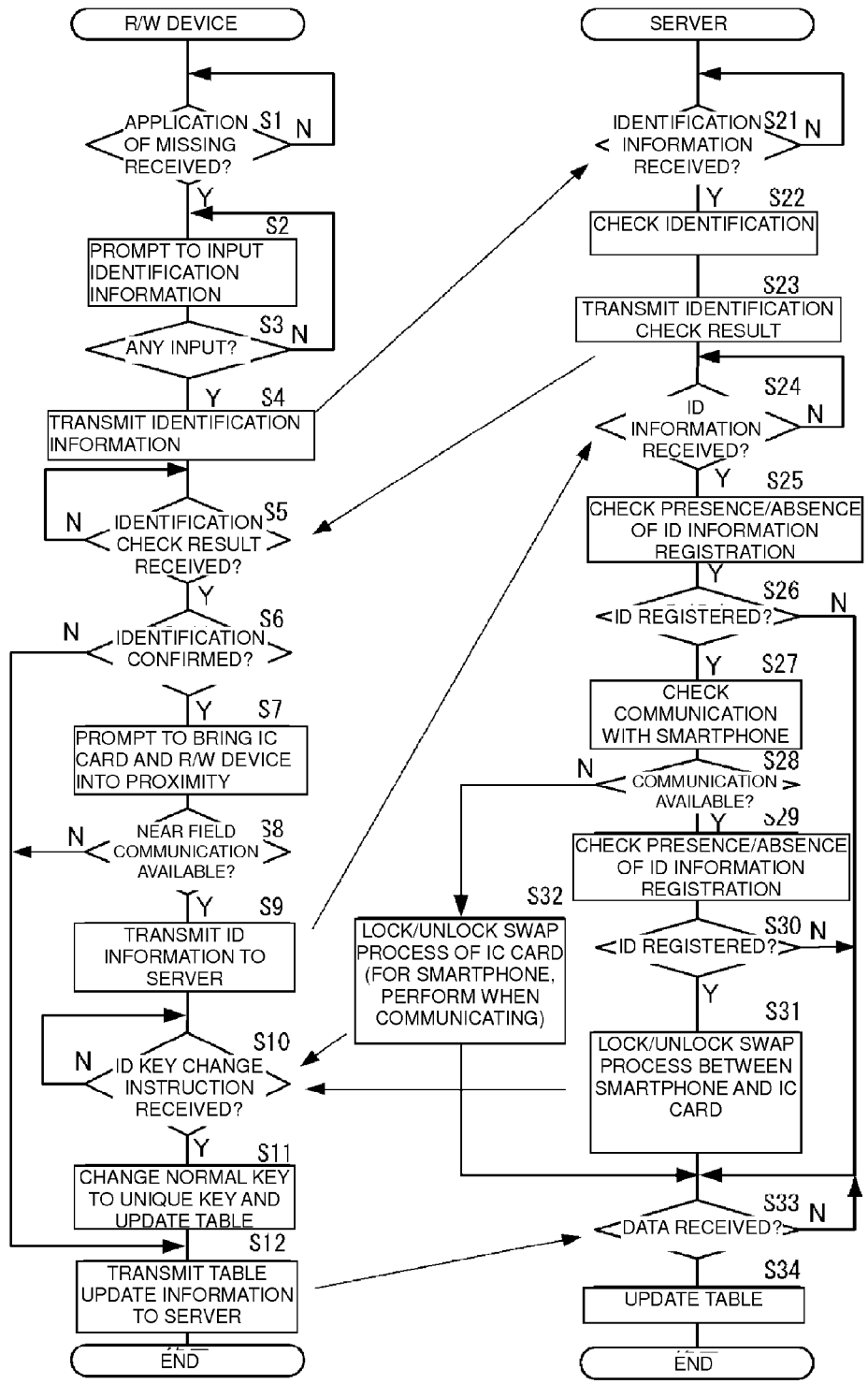
FIG. 7 is a flow chart for illustrating an electronic key swap process.

As illustrated in FIG. 7, upon receiving an application of missing with the operation unit 401 (S1:Y), the control unit 404 of the R/W device 40 displays an indication to prompt the user 100 to make an input for his/her identification (S2, S3:N). The user 100 follows the indication displayed on the display unit 405 and inputs information for identification. For example, the user 100 may input a pre-registered password or birth date of the user 100 or the like.

Upon receiving the input of identification information (S3:Y), the control unit 404 transmits the identification information thus inputted to the server 30 from the external communication unit 402 (S4, S5:N).

Upon receiving the identification information from the R/W device 40 (S21), the control unit 303 of the server 30 checks identification of the user 100 based on registered information of the user 100 stored in the device information memory unit 301 (S22). The control unit 303 transmits an identification check result to the R/W device 40 (S23).

Upon receiving the identification check result (S5:Y), the control unit 404 checks the result. When there is a problem in the result (S6:N), the control unit 404 ends the process. On the other hand, when there is no problem in the result (S6:Y), the control unit 404 subsequently displays an instruction on the display unit 405 to bring the IC card 21 to close proximity of the R/W device 40 (S7). The user 100 brings the IC card 21 to close proximity of the R/W device 40. At this time, the ID identity authentication using NFC starts.

When the near field communication with the IC card 21 is not available (S8:N), the control unit 404 displays an indication to that effect and ends the process.

When the IC card 21 is arranged in the close proximity and the near field communication is available (S8:Y), the control unit 404 performs ID authentication using NFC. In other words, the control unit 404 reads out ID of the normal ID key stored in the IC card 21 at the key memory unit 212. Further, the control unit 404 transmits this ID information to the server 30 (S9).

Upon receiving the ID information from the R/W device 40 (S24), the control unit 303 of the server 30 reads ID information from the table stored in the device information memory unit 301 and checks whether the ID of the IC card 21 is the one registered in advance or not (S25). When it is determined that the ID of the IC card 21 is the one registered in advance (S26), the control unit 303 subsequently checks whether the communication with the smartphone 17 is available or not (S27).

When the communication is available with the smartphone 17 the user 100 has lost (S28:Y), the control unit 303 performs the ID identity authentication of the smartphone 17. In other words, the control unit 303 reads the ID information of the smartphone 17 and checks whether this ID is the one registered in the table in advance or not (S29). When the ID of the IC card 21 is not the one registered in the table in advance (S30:N), the control unit 303 ends the process. On the other hand, when the ID of the IC card 21 is the one registered in the table in advance (S30:Y), the control unit 303 subsequently performs the lock/unlock swap process (S31). In other words, the control unit 303 communicates with the smartphone 17 the user 100 has lost with the communication unit 302 and changes the ID key stored in the smartphone 17 at the key memory unit 172 from the unique ID key to the normal ID key. Further, the control unit 303 instructs the R/W device 40 to change the ID key stored in the IC card 21 at the key memory unit 212 from the normal ID key to the unique ID key.

Upon receiving the instruction to change the ID key from the server 30 (S10:Y), the control unit 404 of the R/W device 40 changes the flag setting to change the normal ID key stored in the key memory unit 212 of the IC card 21 to the unique ID key (S11). Further, the control unit 404, as a first step, updates the clone table stored in the key memory unit 212.

Further, the control unit 404 transmits this clone table information to the server 30 (S12).

Upon receiving the clone table information, the control unit 303 of the server 30, as a second step, updates the table stored in the device information memory unit based on this clone table information (S34).

On the other hand, when it is determined that the communication with the smartphone 17 the user 100 has lost is not available at step S28 (S28:N), the control unit 303 of the server 30 changes the content of the table and, at the next communication with the smartphone 17, changes the ID key stored in the key memory unit 172 from the unique ID key to the normal ID key. Further, the control unit 303 instructs the R/W device 40 to change the ID key stored in the IC card 21 at the key memory unit 212 from the normal ID key to the unique ID key (S32).

The R/W device 40 performs the processes of the foregoing steps S10 and S11. Further, after changing the ID keys and updating the clone table, the R/W device 40 performs the foregoing step S12. Further, the server 30 performs the foregoing steps S33 and S34.

As described above, even when the user 100 lost the electronic device 10 in which the ID information output is in the unlocked state, the unlocked state of this electronic device 10 may be changed to the locked state with the R/W device 40 and the server 30. Further, even when no communication is available with the lost electronic device 10, the locked state of the electronic device 10 the user 100 is currently carrying may be changed to the unlocked state to make the ID information available for use.

Further, in the electronic key system 1, when ID information stored in the electronic device 10 is being used as described above, the electronic device 10 always communicates with the server 30 to check the ID information of electronic key. Thus, as described above, in the case where the communication with the lost electronic device 10 was not available, the ID information output is changed from unlocked to locked when a third party initiates communication with the server 30 in an attempt to use ID information of the lost electronic device 10. This puts the smartphone 17 into the locked state, and the third party is unable to read the ID information of the smartphone 17.

Similarly, in a case where the IC card 21 in which the ID information output is in the unlocked state is lost, the process steps described based on the flow chart illustrated in FIG. 7 are performed except that step S32 is always performed after step S28 since the IC card 21 cannot directly communicate with the server 30 after being lost.

As described above, in various preferred embodiments of the present invention, when an electronic device 10 is lost, the unlocked state of the lost electronic device 10 preferably is changed to the locked state by allowing another electronic device 10 to communicate with the R/W device 40 installed in a convenient store or the like. Thus, even when an electronic device that is operational is lost, ID information of the lost electronic device is reliably prevented from being used by a third party.

Further, in a typical case, a user may not know a telephone number of service center or the like to call at the time when his/her electronic device is lost. However, all that is necessary is the personal identification at a shop or the like. Thus, the change between the unique ID key and the normal ID key may be performed swiftly.

As described above, in various preferred embodiments of the present invention, the unique ID key may be assigned to only one of a plurality of electronic devices and swapped among the plurality of electronic devices. Accordingly, even when an electronic device whose power is on is lost, ID information stored in the lost electronic device is reliably prevented from being used by a third party. Further, unlike a related art, it is not necessary to turn off the power every time the electronic device is used.

In the foregoing description, it is assumed that the outputting of ID key is unlocked when the electronic device stores the unique ID key whereas the outputting of ID key is locked when the electronic device stores the normal ID key. However, it is not limited thereto. For example, an alternative setting may be used such that various functions and ID key output are unlocked when the electronic device stores the unique ID key whereas the various functions and the ID key output are locked when the electronic device stores the normal ID key.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic key system in a network to which a plurality of electronic devices and a server are connected, the electronic key system being configured to control locking and unlocking of ID information output of each of the plurality of the electronic devices, wherein
   each of the plurality of electronic devices includes a switching device configured to lock or unlock output of ID information thereof; and
   the server includes an availability changing unit configured and programmed to unlock one of the plurality of electronic devices and lock all of the of the plurality of electronic devices except the unlocked one, and a management unit configured and programmed to update a state at which the lock of ID information output and the unlock of ID information output are swapped between any pair of the plurality of electronic devices.

2. The electronic key system according to claim 1, wherein the server includes a table describing unlocked and locked states of the plurality of electronic devices.

3. The electronic key system according to claim 1, wherein each of the plurality of electronic devices further includes a communication unit configured to perform identity authentication with the server before outputting ID information when the ID information output is in the unlock state.

4. The electronic key system according to claim 2, wherein, when a pair of the plurality of electronic devices are connected to the server and a request is issued from the pair of the electronic devices to swap the lock and the unlock of ID information output, the management unit updates the table after performing the identity authentication of the pair of the plurality of electronic devices.

5. The electronic key system according to claim 2, wherein
   the electronic device further includes a near field communication unit and a clone table that has an identical content as that of the table included in the server; and
   when a pair of the electronic devices are connected via the near field communication unit and a request is issued between the pair of the plurality of electronic devices to swap the lock and the unlock of ID information output, the clone table is updated after performing identity authentication of the pair of the electronic devices at a first step, and the table is updated by the management unit of the server at a second step.

6. The electronic key system according to claim 2, wherein
   when one of the plurality of electronic devices is connected to the server and a request is issued to swap the lock and the unlock of ID information output between the one of the electronic devices and another electronic device thereof, the management unit of the server updates the table after performing identity authentication of the one of the electronic devices that is connected to the server; and
   when the another of the plurality of electronic devices is connected to the server, the management unit causes the switching device of the another electronic device to switch ID information output thereof based on the table thus updated after performing identity authentication of the another electronic device.

7. The electronic key system according to claim 1, wherein the plurality of electronic devices includes a watch, a camera, a computer, a phone and an IC card.

8. The electronic key system according to claim 1, wherein only one of the plurality of electronic devices is unlocked for ID information output while all of the plurality of electronic devices except for the only one of the plurality of electronic devices are locked for ID information output.

9. The electronic key system according to claim 1, wherein the availability changing unit includes a control unit configured and programmed to control the use of ID information such that only one of the plurality of electronic devices is unlocked for ID information output at any time.

10. The electronic key system according to claim 1, wherein the server includes a device information memory unit, a communication unit, and a control unit.

11. The electronic key system according to claim 10, wherein the device information memory unit is configured to store the ID of an ID key and which of a unique ID key or a normal ID key of each of the plurality of electronic devices is assigned to.

12. The electronic key system according to claim 10, wherein communication unit is configured to communicate with the plurality of the electronic devices and a read write device.

13. The electronic key system according to claim 10, wherein the control unit is configured and programmed to confirm whether an electronic key is a registered one by communicating through the communication unit when a reading of ID information of one of the plurality of electronic devices occurs.

14. The electronic key system according to claim 10, wherein the control unit is configured and programmed to permit or not permit reading of ID information.

15. The electronic key system according to claim 10, wherein the electronic key system is configured to set an electronic key of only one of the plurality of electronic devices to be a unique ID key and an electronic key of all of the plurality of electronic devices except for the only one of the plurality of electronic devices is set to be normal ID keys.

16. An electronic device in a network to which a plurality of electronic devices and a server are connected, wherein
the server unlocks ID information output of only one of the plurality of electronic devices and locks ID information output of the plurality of electronic devices except for the only one of the plurality of electronic devices; and
for each of the plurality of electronic devices, the ID information output of the respective electronic device is permitted by the server when the ID information output of the respective electronic device is in an unlocked state, and the ID information output of the respective electronic device is not permitted by the server when the ID information output of the respective electronic device is in a locked state.

17. The electronic device according to claim 16, wherein
the respective electronic device performs identity authentication with the server before outputting the ID information when the ID information output of the respective electronic device is in the unlocked state;
the ID information output of the respective electronic device is allowed when the identity authentication is successful; and
the ID information output of the respective electronic device is not allowed when the identity authentication is not successful.

* * * * *